United States Patent [19]

McCracken

[11] Patent Number: 5,005,344
[45] Date of Patent: Apr. 9, 1991

[54] LIGHT BRUSH AND GRASS HYDRAULIC MOWER

[76] Inventor: Doc J. McCracken, 218 W. 1st St.; P.O. Box 322, Tonganoxie, Kans. 66086

[21] Appl. No.: 461,650

[22] Filed: Jan. 8, 1990

[51] Int. Cl.⁵ .............................................. A01D 35/12
[52] U.S. Cl. ..................................... 56/14.7; 56/16.7
[58] Field of Search ...................... 56/10.1, 10.2, 10.4, 56/10.8, 10.9, 11.9, 14.7, 16.7, 16.9, DIG. 11

[56] References Cited

U.S. PATENT DOCUMENTS

| | | | |
|---|---|---|---|
| 2,193,712 | 3/1940 | Campbell | 56/16.7 X |
| 2,865,159 | 12/1958 | Musgrave | 56/14.7 |
| 3,303,524 | 2/1967 | Schneider | 56/16.7 X |
| 3,724,182 | 4/1973 | Long et al. | 56/10.4 |
| 4,514,967 | 5/1985 | Scanland et al. | 56/14.7 |

Primary Examiner—Thuy M. Bui
Attorney, Agent, or Firm—Kokjer, Kircher, Bradley, Wharton, Bowman and Johnson

[57] ABSTRACT

A grass and brush mowing attachment for a fork lift or other front loading machine which is operated hydraulically and which includes forwardly projecting tines. The mowing attachment has a deck with side skirts having runners on their lower edges. Sleeves on the deck receive the tines of the fork lift, and chains are also connected between the deck and the machine. The mowing deck has a blade which is driven by a reversible hydraulic motor that has detachable hose connections with the hydraulic pump on the fork lift. The blade is sharp on both edges and is equipped with pivotal kick back blades on its opposite ends.

20 Claims, 2 Drawing Sheets

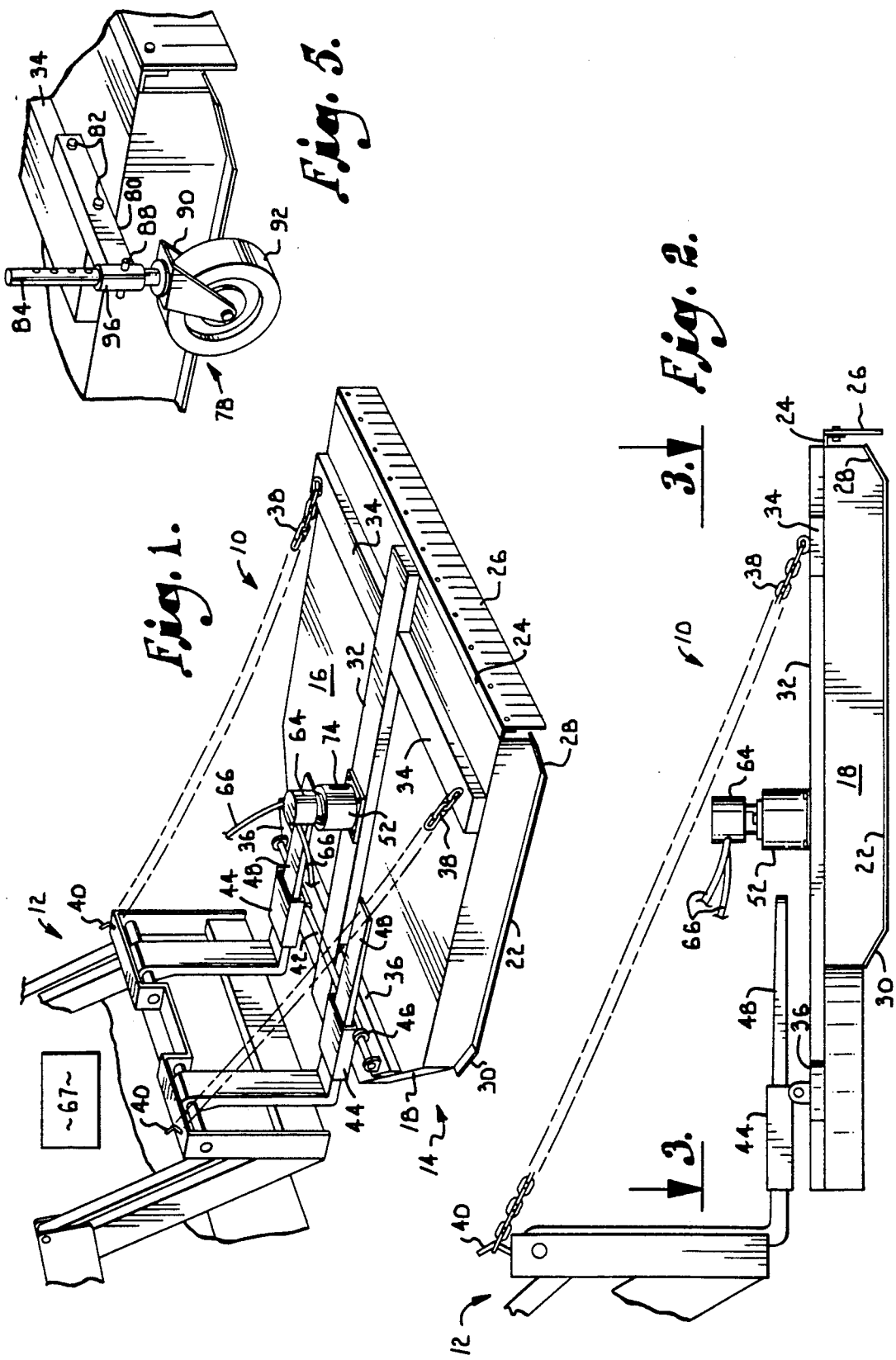

LIGHT BRUSH AND GRASS HYDRAULIC MOWER

BACKGROUND OF THE INVENTION

This invention relates to mowing devices and, more particularly, to a hydraulically-powered mower that is attachable to the tines of front loader equipment, such as fork lifts or skid loaders.

One type of mower presently employed for cutting light brush and grass is designed to be connected by a 3 point hook up to the rear of a tractor. The Power Take Off (PTO) of the tractor is used as the source of power to rotate the cutting blades.

One drawback of this type of mower is the mower position. The mower is pulled by, and thus trails, the tractor. This results in a mower position which is not in the operator's preferred line of sight, which can be hazardous. Since it is often necessary to watch the mower to make sure it is performing adequately, the operator must turn around and, accordingly, momentarily look in a direction opposite from that in which the apparatus is traveling. This leaves the operator unaware of objects in the mower's path. Also, mowers commonly throw debris out the front portion of the mower, resulting in debris being thrown toward the operator.

Another drawback of this type of mower is the limited output efficiency of its power source in comparison with a hydraulic-powered device. Additionally, the operation of conventional mowers typically requires complex parts such as a gear unit and drive shaft. Each of these entails a variety of working parts which can be costly to replace in the event of a breakdown.

Another disadvantage of typical existing mowers is the inability of the blade to rotate in either direction. Additionally, a large area is required to turn the tractor and mowing device around.

The use of hydraulic power to drive the blades of a mower has been shown in U.S. Pat. No. 3,946,543 (Templeton). However, this device additionally employs chains, sprockets, and gears which are not as efficient or dependable as the coupling used in accordance with the present invention.

U.S. Pat. No. 4,487,006 (Scag) discloses a lawn mowing device having a cutting assembly attached by forks to a riding unit. The mower uses a gas engine to power its wheels for movement. The same engine is appropriately connected for rotating the cutting assembly. This mowing unit is designed as a whole, rather than an inexpensive mowing attachment.

SUMMARY OF THE INVENTION

It is an object of this invention to provide an inexpensive mowing device for cutting light brush and grass.

It is an object of this invention to provide a mowing attachment which can be easily connected to the tines of front loader equipment.

It is an object of this invention to provide a mowing device which utilizes the efficiency of a hydraulic-powered motor to rotate the cutting blades.

It is another object of this invention to provide a mower with improved dependability through the use of fewer working parts.

It is a further object of this invention to provide a mowing apparatus with blades capable of operating in either direction with ease of reversibility.

It is an object of this invention to provide a mower with improved safety.

It is an object of this invention to provide a mower with enhanced mobility and which can be easily raised or lowered to desired cutting heights.

In general, the invention comprises a light brush and grass mowing apparatus readily adapted for attachment to the tines of a front loader, or fork lift. A steel back and blade shroud overlay and shield a blade assembly. A main support brace extends from the front to the rear of the mower and is located on top of the blade deck in a location that is balanced from either side. Skid runners are located along either side of the mower at the bottom of the downwardly extending skirt of the blade deck. This aids the mower in gliding over rough terrain and prevents the skirt from being bent and damaged when the mower comes in contact with the ground. A belt webbing is positioned on the forward portion of the shroud to prevent debris from being thrown from the shroud.

Front and rear lateral attachment braces provide means for easily connecting the device to front loader equipment.

Particularly, a rod provided with adjustable slip collars is mounted at the outer edge of each rear support brace. A sleeve for receiving the tines of the fork lift is pivotally connected to each slip collar. This allows the sleeves to be easily adjusted to adapt to different fork spacings. Each front attachment brace supports near its outer edge a chain or cable which extends to a connecting point on the loader. This relieves stress at the sleeves and prevents the front portion of the mower from digging into the ground. Additionally, caster wheels may be attached to the front brace at each side of the mower to yield substantially the same effect.

A hydraulic mower is connected by hoses to the hydraulic power supply of the fork lift. The motor is mounted atop a motor base which is in turn mounted atop the main support brace. The motor brace also houses a coupling which connects the hydraulic motor to the blade assembly. The blade assembly is comprised of a main blade and hub and two kick-back blades, sharpened on both sides, mounted on either end of the main blade.

For operation, the sleeves may be laterally adjusted to correspond with the tines of a fork lift. The fork lift may be maneuvered forward until its tines are received within the sleeves of the mower. After the chains and hoses are fastened, the tines of the fork lift may be raised or lowered to the desired cutting level. The maneuverability of the fork lift allows for safely mowing relatively small areas. Hydraulic fluid may be delivered to the motor in either direction, resulting in the desired blade rotation. To quickly release the mower from the fork lift device, the tines may be lowered so that the skid runners of the mower rest on the ground. After releasing the chains and the hoses, the fork lift may be moved backwards until the tines are free of the sleeves.

SUMMARY OF THE DRAWINGS

FIG. 1 is a perspective view of a light brush and grass hydraulic mower constructed in accordance with a preferred embodiment of the present invention, shown mounted on the tines of a front loading machine;

FIG. 2 is a side elevational view of the mowing device;

FIG. 5 is a fragmentary perspective view illustrating an optional wheel assembly which may be incorporated in the mower in accordance with the present invention.

DETAILED DESCRIPTION OF THE PREFERRED EMBODIMENT

Figure 3:
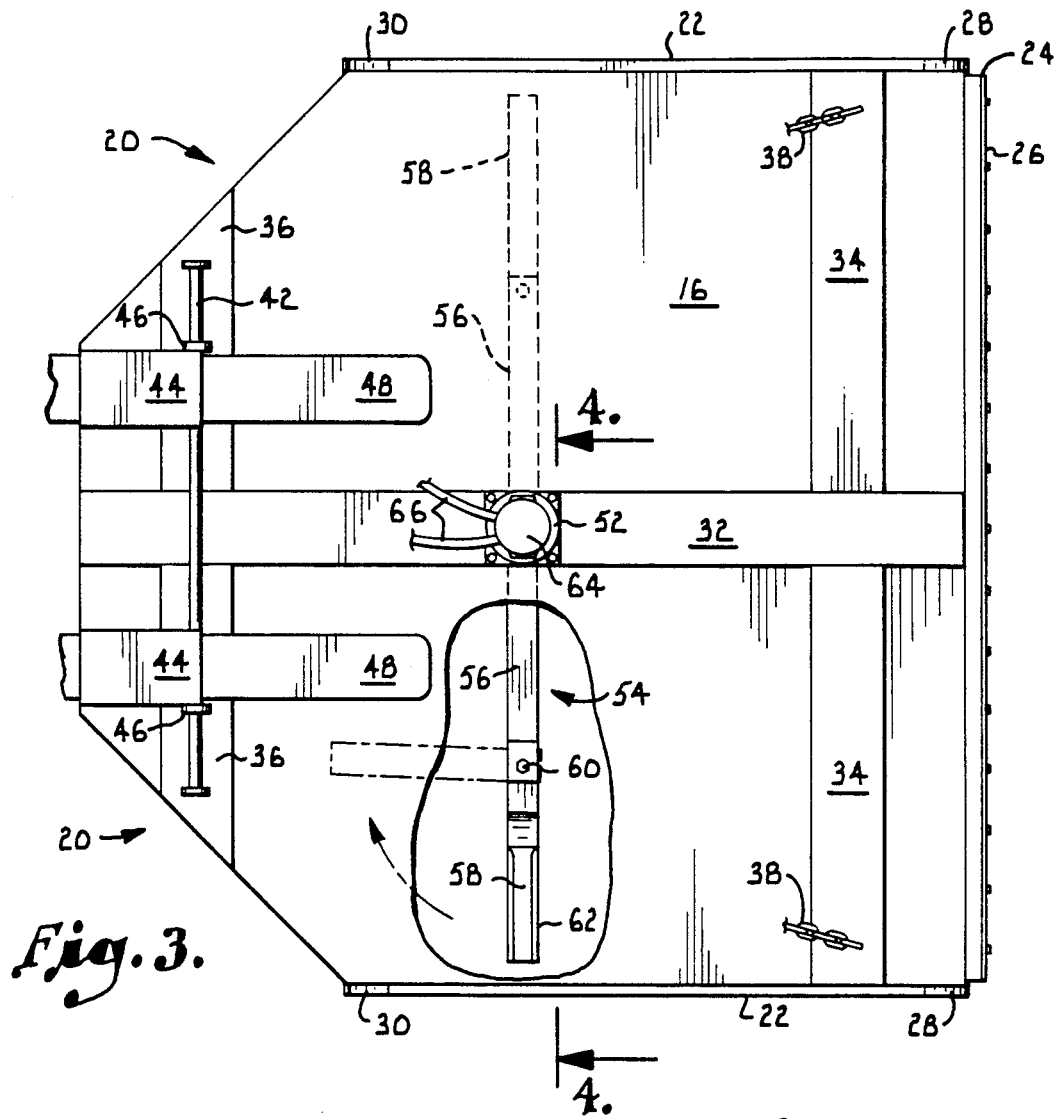
FIG. 3 is a top plan view taken along line 3—3 of FIG. 2 with a portion broken away showing the kick back blade assembly.

Referring initially to FIGS. 1 and 2, numeral 10 generally denotes the light brush and grass hydraulic mower of the present invention. It is shown attached to the front portion 12 of a front loading machine (not fully shown). The front loading machine 10 may be a skid loader, a fork lift or another machine having tines or forks on its front end.

The mower 10 has a blade shroud 14, preferably made of ten gauge mauled steel, comprised of a deck 16 and a downwardly extending skirt 18. The shroud 14 tapers at the rear (as seen best at 20 in FIG. 3). As seen in FIG. 2, the skirt 18 extends downwardly to a greater extent forward of the taper to accommodate skid runners 22 mounted on opposite sides of the shroud on its lower edges. The skid runners, preferably two inches wide, allow the mower to glide more easily over the ground without damaging the skirt 18. The skid runners 22 have an upwardly angled forward portion 28 and rear portion 30 which prevent the mower from plowing into the ground when the apparatus is being maneuvered while in a forward or reverse direction, respectively. The front portion of the mower 10, absent the skirt 18, utilizes an angle 24 and a rubber or plastic belt web 26 to stop foreign objects from being thrown forwardly from the shroud.

Frontal attachment braces 34 and rearward attachment braces 36 provide a base to make attachments for quick release on front loader type equipment. Rod member 42 is mounted to the outer edge of each rearward brace 36 and extends laterally across the rear of the mower 10. Tine receiving sleeves 44 are pivotally connected with rod 42. The sleeves 44 may be laterally adjusted to accommodate varied spacing of the tines 48, which extend from the front of the fork lift and may be raised and lowered in the usual manner. Slip collars 46 are pivotally sleeved in rod 42 and carry the sleeves 44. The frontal attachment braces 34 are connected with the forward ends of a pair of flexible chains 38 which are connected at their opposite ends to hooks 40 mounted on the front loading machine for up and down movement with the tines 48. This aids in keeping the mower level and preventing the front end of the mower from plowing into the ground.

Figure 4:
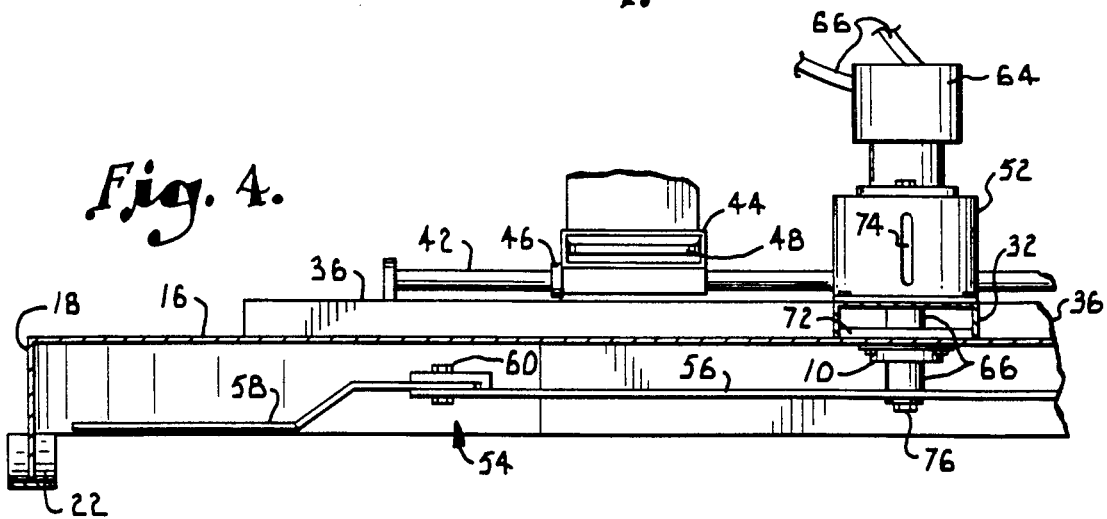
FIG. 4 is a fragmentary sectional view taken along line 4—4 of FIG. 3.

A main brace 32 extends longitudinally from the front to the rear of the deck 16. The main brace 32 provides a mounting surface for motor base and coupling housing unit 52 (FIG. 4). A hydraulic motor 64 is mounted on top of the motor base and coupling housing 52.

Referring now to FIGS. 3 and 4, the blade assembly 54 is comprised of a main blade 56 and two kick back blades which are mounted on opposite ends of the main blade 56. The kick back blades 58 are held in place by hex head shoulder bolts 60, preferably manufactured from 4140 hex material and heat treated to 45–48 Rockwell. The hole in the kick back blade through which bolt 60 extends has a replaceable, hardened bushing (not shown) for safety and wear. As shown in the broken away portion of FIG. 3, both edges 62 of the kick back blades are sharpened to enhance the life of the blade and allow it to cut when the main blade 56 is rotating in either direction. In operation, if either kick back blade 58 strikes a solid, immovable object, it will kick back about the axis of bolt 60 to the broken line position of FIG. 3, allowing it to bypass the object and prevent damage to the blade assembly.

Referring now to FIG. 4, a hydraulic motor 64 is mounted to the top of the motor base and coupling housing 52. The hoses 66 transmit fluid from the hydraulic source 67 on the front loading machine to the motor 64. The hoses 66 may be equipped with conventional quick connect couplings (not shown) which permit them to be quickly connected to and disconnected from the motor 64 and/or the hydraulic pump 67 on the machine. The hydraulic motor preferred is a low speed high torque motor capable of developing 800 rpms at 11 gallons per minute input and 975 rpms at 16 gallons per minute input. This will develop approximately four h.p. at 11 gallons per minute, 2,250 lbs. per square inch and 20 h.p. at 60 gallons per minute, 2,250 lbs. per square inch. A motor that has been found to perform satisfactorily has a specification number of 1-10-AS, as sold by Hydraulic Power Systems, Inc. (HPS). It is within the scope of this invention to include motors with different capabilities. Furthermore, it is recognized and within the scope of the invention that a flow divider valve could be employed to reduce the hydraulic flow to a level within the motor's capabilities should the hydraulic pump rate exceed the motor's specified limits. It is also within the scope of the present invention to include additional motors if a larger cutting area is desired, as would be accomplished in a manner as set forth in this invention with larger or additional blades.

The motor base and coupling housing 52 is bolted to the main brace 32. The motor 64 is coupled to the blade shaft 66 by conventional coupling means (not shown) located inside the housing. An aluminum-like finger type coupling that is preferred has a specification number of Model 200 hub. This is a standard industry coupling with a built-in safety feature. Should the blade assembly 54 meet with a solid, immovable object, the hydraulic flow will bypass the coupling. Opening 74 of the motor base and coupling housing 52 allows for greasing of the coupling without removing the motor base and coupling housing 52.

Bearing 70 provides rotational support for shaft 66 and is bolted through the deck 16 to a plate 72 which is tap welded to the top side of the deck 16 below the main brace 32. Preferably, the main blade is attached to the blade shaft 66 by a one inch slotted hex nut 76 and ⅜inch cotter keys (not shown).

Referring now to FIG. 5, an optional wheel attachment assembly 78 is shown. Since the same type of assembly would also be present on the other side of the mower, only one side will be described. A rod member extension arm 80 is attached by fasteners 82 to frontal brace 34. The outwardly extending end of rod 80 carries a hollow vertical sleeve 96. Column 96 receives generally upright rod member 84. Rod member 84 has holes 86 which align with tubes in sleeve 96 and receive a pin 88 for height adjustment. The rod member 84 is connected to axle assembly 90 which serves to support the caster wheel 92.

For operation, the mower 10, while resting on the ground, may be easily attached to a fork lift device by maneuvering the fork lift so as to insert the tines 48 of the fork lift into the appropriately spaced sleeves 14. Chains 38 are connected between the frontal brace 36 and the fork lift. Hoses 66 are connected between the motor 64 and the fork lift hydraulic power supply. The fork lift can be maneuvered in its normal fashion to areas for mowing. The hydraulic power can be activated, and through the use of pedals or other actuators which control hydraulic valves, the fluid can be forced to flow in either direction through the motor, resulting in a blade rotation in the preferred direction. Alternatively, the hoses could be reversed to yield the desired blade rotation. Raising and lowering the tines 48 of the fork lift allows varied cutting heights. For mowing under fences, the chain 38 may be momentarily disconnected and the mower 10 maneuvered under the fences.

To release the mower 10 from the fork lift, the tines 48 are lowered until the skid runners 22 are resting firmly on the ground. The chains 38 and hoses 66 are disconnected and the fork lift may be moved in a reverse direction, thereby removing the tines 48 from sleeves 44.

In this manner, the mower 10 makes use of the motive capabilities and hydraulic power of the fork lift in order to mow, and it is easily detachable so that the fork lift can be used for its ordinary tasks as well. At the same time, the mower 10 exhibits improved mowing characteristics in a number of respects over conventional mowing equipment.

It will be understood that variations and modifications may be affected without departing from the spirit and scope of the novel concepts of the present invention.

Having thus described the invention, I claim:

1. Mowing apparatus for attachment to a self propelled machine having a hydraulic power source and a pair of tines projecting forwardly from the machine, said apparatus comprising:
   a mowing deck;
   means for detachably connecting said mowing deck to the tines of the machine for movement of the deck with the tines;
   a cutting blade mounted beneath said mowing deck for rotation to provide cutting action when the blade is rotated;
   a hydraulic motor mounted on said deck and coupled with said blade in a manner to rotate the blade when the motor is actuated; and
   detachable means for connecting said hydraulic power source with said motor to supply fluid to the motor for actuating same.

2. Apparatus as set forth in claim 1, including
   a pair of side skirts projecting downwardly from opposite sides of said deck; and
   a runner on each side skirt extending along a lower edge thereof.

3. Apparatus as set forth in claim 1, including a flexible member having one end connected with said mowing deck and another end detachably connected with the machine at a location above the tines.

4. Apparatus as set forth in claim 1, wherein said detachable connecting means for said mowing deck comprises a pair of sleeves on the deck spaced apart to closely receive the tines therein.

5. Apparatus as set forth in claim 4, including means for mounting said sleeves for pivotal movement about a common axis.

6. Apparatus as set forth in claim 4, including a transverse brace on said deck on which said sleeves are mounted.

7. Apparatus as set forth in claim 6, including:
   a pair of flexible members each having first and second ends;
   a second transverse brace on said deck offset forwardly from the first mentioned transverse brace, the first end of each flexible member being connected to said second transverse brace; and
   means for detachably connecting the second end of each flexible member to the machine at locations above the tines.

8. Apparatus as set forth in claim 7, including a longitudinal brace extending between the first and second transverse braces, said hydraulic motor being mounted on said longitudinal brace.

9. Apparatus as set forth in claim 1, wherein:
   said hydraulic motor is reversible to rotate the blade in opposite rotational directions; and
   said blade has a pair of opposite edges both of which are sharpened to cut when the blade is rotated in opposite directions.

10. Apparatus as set forth in claim 9, including a kick back blade mounted on each end of said cutting blade in a manner allowing the kick back blade to pivot relative to the cutting blade when the kick back blade strikes an obstacle.

11. Apparatus as set forth in claim 1, including a kick back blade mounted on each end of said cutting blade in a manner allowing the kick back blade to pivot relative to the cutting blade when the kick back blade strikes an obstacle.

12. A mowing attachment for a self propelled front loading machine having a hydraulic power source and a pair of spaced apart working tines which project forwardly from the machine and which may be raised and lowered in unison to perform work, said mowing attachment comprising:
   a shroud having a mowing deck and side skirts projecting downwardly from said deck;
   sleeve means mounted on said deck and providing openings for detachably receiving the tines of the machine in a manner to mount said shroud on the machine for movement therewith and for up and down movement with the tines;
   a flexible member coupled at one end with the shroud at a location offset from said sleeve means and detachably coupled at the other end with the machine;
   a hydraulic motor mounted on said deck;
   fluid hose means for detachably coupling the hydraulic power source with said hydraulic motor to supply fluid for actuating the motor;
   a cutting blade mounted for rotation on said shroud beneath the deck; and
   means for coupling said hydraulic motor with said blade to effect rotation of the blade when the motor is actuated.

13. An attachment as set forth in claim 12, including a runner carried on the lower end of each side skirt.

14. An attachment as set forth in claim 12, including spaced apart first and second transverse braces on said mowing deck, said sleeve means being mounted on said first transverse brace and said one end of the flexible member being connected with said second brace.

15. An attachment as set forth in claim 14, including a longitudinal brace extending on the deck between said first and second transverse braces, said hydraulic motor being mounted on said longitudinal brace.

16. An attachment as set forth in claim 14, wherein said sleeve means comprises a pair of spaced apart sleeves on said first brace, each mounted for pivotal movement about a common pivot axis.

17. An attachment as set forth in claim 12, wherein said sleeve means comprises a pair of spaced apart sleeves on said deck, each mounted for pivotal movement about a common pivot axis.

18. An attachment as set forth in claim 12, wherein:
said hydraulic motor is reversible to rotate the blade in opposite rotational directions; and
said blade has a pair of opposite edges both of which are sharpened to cut when the blade is rotated in opposite directions.

19. An attachment as set forth in claim 18, including a kick back blade mounted on each end of said cutting blade in a manner allowing the kick back blade to pivot relative to the cutting blade when the kick back blade strikes an obstacle.

20. An attachment as set forth in claim 12, including a kick back blade mounted on each end of said cutting blade in a manner allowing the kick back blade to pivot relative to the cutting blade when the kick back blade strikes an obstacle.

* * * * *